United States Patent [19]
Witt et al.

[11] Patent Number: 5,616,624
[45] Date of Patent: Apr. 1, 1997

[54] PREPARATION OF BEAD-FORM EXPANDABLE STYRENE POLYMERS HAVING IMPROVED EXPANDABILITY

[75] Inventors: Michael Witt, Ludwigshafen; Dietrich Scherzer, Neustadt; Klaus Hahn, Kirchheim; Dieter Naegele, Worms, all of Germany

[73] Assignee: BASF Aktiengesellschaft, Ludwigshafen, Germany

[21] Appl. No.: 495,594

[22] PCT Filed: Mar. 5, 1994

[86] PCT No.: PCT/EP94/00662

§ 371 Date: Aug. 2, 1995

§ 102(e) Date: Aug. 2, 1995

[87] PCT Pub. No.: WO94/21719

PCT Pub. Date: Sep. 29, 1994

[30] Foreign Application Priority Data

Mar. 18, 1993 [DE] Germany .......................... 43 08 636.5

[51] Int. Cl.$^6$ ....................................... C08J 9/18
[52] U.S. Cl. ................................. 521/56; 521/59
[58] Field of Search .......................... 521/56, 59

[56] References Cited

U.S. PATENT DOCUMENTS 3,755,282   8/1973   Wright .............................. 260/93.5 W

*Primary Examiner*—Morton Foelak
*Attorney, Agent, or Firm*—Keil & Weinkauf

[57] ABSTRACT

A process for the preparation of bead-form expandable styrene polymers by polymerizing styrene, if desired in the presence of further comonomers, in aqueous suspension in the presence of organic molecular colloids as suspension stabilizers and conventional styrene-soluble polymerization catalysts and with addition of a blowing agent and, if desired, conventional additives in effective amounts, wherein the aqueous suspension contains at least one olefinically unsaturated carboxylic acid or a water-soluble salt thereof in an amount, based on the organic phase, of from 0.002 to 0.3% by weight of carboxylate anions.

4 Claims, No Drawings

PREPARATION OF BEAD-FORM EXPANDABLE STYRENE POLYMERS HAVING IMPROVED EXPANDABILITY

The present invention relates to a process for the preparation of bead-form expandable styrene polymers (EPSs) having improved expandability by polymerizing styrene, if desired in the presence of further comonomers, in aqueous suspension in the presence of a molecular colloid and a small amount of at least one unsaturated carboxylic acid or a water-soluble salt thereof.

Foams based on styrene polymers have achieved considerable industrial importance as thermal insulation and packaging materials. They are produced on an industrial scale by first preparing expandable styrene polymers by suspension polymerization of styrene in the presence of a blowing agent, expanding these polymers to foam particles by heating, and subsequently welding the particles in molds to give moldings.

This suspension polymerization is carried out in the presence of suspension stabilizers and conventional styrene-soluble polymerization catalysts.

The suspension stabilizers employed are usually, in addition to so-called Pickering stabilizers, in particular molecular colloids, such as polyvinyl alcohols, hydroxyethylcellulose or polyvinylpyrrolidone.

An important property for industrial utilization of the blowing agent-containing EPS beads produced in this way is the expansion capacity, a differentiation being made here between the expansion rate and the minimum achievable bulk density.

In order to achieve very low bulk densities and a high expansion rate, the patent literature gives various methods which, without exception, are aimed at improving the flow properties of the polymer matrix in the plastic state.

In addition to targeted modeling of the molecular weight distribution by means of conventional molecular weight regulators, for example tert-dodecyl mercaptan or DMS (dimeric α-methylstyrene) (cf. EP-B-106 129), intentional branching of the molecular units by means of difunctional or polyfunctional monomers, for example butanediol disacrylate, is also known here.

Expandable styrene polymers prepared by suspension polymerization have a certain internal water content immediately after the polymerization.

High internal water contents occur, in particular, in flame-resistant, expandable styrene polymers containing, as flameproofing agents, organobromine compounds, such as hexabromocyclododecane.

It is an object of the present invention to provide a process for the preparation of bead-form expandable styrene polymers having improved expandability in which targeted modeling of the molecular weight distribution is unnecessary. It is a further object of the present invention to provide a process for the preparation of bead-form expandable styrene polymers in which the drying of the expandable styrene polymer beads which still contain water after the suspension polymerization can be carried out more rapidly.

We have found that this object is achieved by a process for the preparation of bead-form expandable styrene polymers by polymerizing styrene, if desired in the presence of further comonomers, in aqueous suspension in the presence of organic molecular colloids as suspension stabilizers and conventional styrene-soluble polymerization catalysts and with addition of a blowing agent and, if desired, conventional additives in effective amounts, wherein the aqueous suspension contains at least one olefinically unsaturated carboxylic acid or a water-soluble salt thereof in an amount, based on the organic phase, of from 0.002 to 0.3% by weight of carboxylate anions.

U.S. Pat. No. 3,755,282 describes the suspension polymerization of vinyl aromatic monomers in the presence of from 0.2 to 1% by weight, based on the monomer, of a phosphate suspending agent (for example magnesium phosphate) and an α,β-unsaturated carboxylic acid as the only extender. For the purpose of the present invention, extenders are taken to mean compounds which increase the suspension-stabilizing action of the finely divided phosphate. The process gives large, virtually spherical beads having a low bead-size distribution. Examples of α,β-unsaturated carboxylic acids given include acrylic acid, methacrylic acid, crotonic acid, maleic acid and fumaric acid. The use of organic molecular colloids is thus expressly excluded in U.S. Pat. No. 3,755,282.

For the purposes of the present invention, styrene polymers are polystyrene and copolymers of styrene with other α,β-olefinically unsaturated compounds which contain at least 50 parts by weight of copolymerized styrene. Examples of suitable comonomers in the process according to the invention are therefore α-methylstyrene, ring-halogenated styrenes, ring-alkylated styrenes, acrylonitrile, esters of acrylic or methacrylic acid with alcohols having 1 to 8 carbon atoms, N-vinyl compounds, such as vinylcarbazole, or alternatively small amounts of compounds which contain two polymerizable double bonds, such as butadiene, divinylbenzene or butanediol diacrylate.

As blowing agent in the process according to the invention, from 1 to 10% by weight, preferably from 3 to 8% by weight, based on the styrene polymer, of a $C_3$- to $C_7$-hydrocarbon (such as propane, butane, isobutane, n-pentane, i-pentane, neopentane and/or hexane) and/or carbon dioxide is generally employed.

If carbon dioxide is used as blowing agent or a blowing agent constituent, it is advantageously to employ a carbon dioxide absorber, as described in German Patent Application P 41 37 405.3.

The styrene polymers may also contain conventional additions of other substances which provide the expandable products with certain properties. Examples which may be mentioned are flameproofing agents based on organic bromine or chlorine compounds, such as tris-dibromopropyl phosphate, hexabromocyclododecane, chlorinated paraffin, and synergists for flameproofing agents, such as dicumyl peroxide and highly unstable organic peroxides; furthermore antistatics, stabilizers, dyes, lubricants, fillers and substances which have an antiadhesive action during prefoaming, such as zinc stearate, melamine-formaldehyde condensates or silica, and agents for shortening the demolding time during expansion for example glycerol esters or hydroxycarboxylic esters. Depending on the intended action, the additives may be homogeneously distributed in the particles or in the form of a surface coating.

Accordingly, the additives are either added during the process according to the invention or subsequently applied to the expandable styrene polymers prepared according to the invention.

In the process according to the invention, bead-form expandable styrene polymers are prepared by polymerizing styrene, if desired together with up to 50% by weight of the abovementioned comonomers, in aqueous suspension, with the above-described blowing agents and, if desired, conventional additives in effective amounts being added before, during or after the polymerization.

The polymerization can also be carried out in the presence of a conventional chain-transfer agent which regulates the molecular weight. Preference is given to tert-dodecyl mercaptan or DMS (dimeric α-methylstyrene). The regulator is generally used in an amount of from 0.0001 to 0.01% by weight, based on styrene.

The process according to the invention is carried out in the presence of an organic molecular colloid. Preference is given to polyvinylpyrrolidone, polyvinyl alcohols and hydroxyethylcellulose.

The process according to the invention is carried out in the presence of an organic molecular colloid. Preference is given to polyvinylpyrrolidone, polyvinyl alcohols and hydroxyethylcellulose.

The molecular colloids generally have a weight average molecular weight of at least $10^6$ g/mol and are advantageously employed in a concentration of from 0.1 to 0.5% by weight, based on the aqueous phase. In the case of polyvinyl alcohols, a degree of hydrolysis of from 92 to 97% is advantageous.

An essential feature of the process according to the invention is the use of at least one olefinically unsaturated carboxylic acid in an amount, based on the organic phase, of from 0.002 to 0.3% by weight, preferably from 0.01 to 0.06% by weight, particularly preferably from 0.02 to 0.03% by weight of carboxylate anions.

The olefinically unsaturated carboxylic acids can be employed either as free acids or in the form of their water-soluble salts, in particular their alkali metal salts.

Olefinically unsaturated carboxylic acids which are particularly suitable according to the invention are α,β-unsaturated carboxylic acids. Examples of these are acrylic acid, methacrylic acid and sorbic acid. Particular preference is given to acrylic acid and sorbic acid, and the alkali metal salts thereof.

The olefinically unsaturated carboxylic acids or their water-soluble salts can be employed partially or fully in oligomeric or polymeric form. An example thereof is Polysalz® S from BASF Aktiengesellschaft, which is a polymeric sodium acrylate having a weight average molecular weight of 5000 in the form of a 45% strength aqueous solution.

The olefinically unsaturated carboxylic acids are preferably added to the aqueous suspension in the process according to the invention before the polymerization has reached a conversion of 50%, based on the starting monomers.

When the polymerization is complete, the bead-form expandable styrene polymers obtained are, in a known manner, separated from the aqueous phase, washed and dried.

Surprisingly, it has been found that the internal water content in the bead-form expandable styrene polymers prepared according to the invention can be reduced more rapidly and thus more efficiently than in the case of known preparation processes. This is particularly important for expandable styrene polymers which contain a flameproofing agent. Thus, expandable styrene polymers which contain organobromine compounds as flameproofing agent frequently have internal water contents which must first be reduced by drying in a stream of air for a number of hours.

The blowing agent-containing styrene polymer particles prepared according to the invention generally have a diameter of from 0.2 to 4 mm. They can be prefoamed by conventional methods, for example by means of steam, to give foam particles having a diameter of from 0.1 to 2 cm and a bulk density of from 0.005 to 0.1 g/cm³.

The prefoamed particles can then be foamed to completion by conventional methods to give foam moldings having a density of from 0.005 to 0.1 g/cm³.

In the examples, parts are by weight.

EXAMPLES 1 TO 4 AND COMPARATIVE EXAMPLES 1 AND 2

Example 1

Polymerization

A mixture of 150 parts of water, 0.1 part of sodium pyrophosphate, 100 parts of styrene, 0.15 part of dibenzoyl peroxide, 0.25 part of t-butyl perbenzoate and 0.05 part of potassium sorbate was heated to 85° C. over the course of 2 hours with stirring in a pressure-tight stirred reactor made of stainless steel. When the mixture had reached 85° C., 1.5 parts of a 10% strength aqueous solution of polyvinylpyrrolidone (Fikentscher K value 90) were added. The temperature was subsequently raised continuously to 125° C. over the course of 4 hours. 30 minutes before the maximum temperature was reached, 7 parts of pentane were metered into the reactor. The polymerization was then completed at a constant temperature of 125° C. over the course of 6 hours. The batch was then cooled, and the polymer was separated from the aqueous phase and washed.

Work-up

The water adhering to the surface of the beads was removed by suction filtration for 10 minutes. Directly thereafter, the resultant beads were conditioned for 30 minutes in a stream of warm air and subsequently separated into screen fractions. The means particle size was determined by the Rosin-Rammler-Sperling-Bennett method as described in DIN 66 145.

Coating 100 parts of the expandable polystyrene granules having the bead size fraction from 0.7 to 1.0 mm in diameter were coated with 0.4 part of glycerol monostearate in a blade mixer drum for 4 minutes.

Prefoaming of the EPS Beads

A portion of these coated beads was treated with a stream of steam in a batch prefoamer, Händle type. Under standardized conditions (EPS weight 1.5 kg, steam excess pressure 1.3 bar), the expansion behavior was quantified. To this end, the foaming times before three light beam guards at different heights were reached were determined.

Another portion of the coated beads was used to determine, in a continuous prefoamer, Rauscher C69 type, the product throughput for a prespecified bulk density and the minimum achievable bulk density. The results are shown in Table 1.

Example 2

The procedure was similar to that of Example 1, but 0.05 part of sodium acrylate was introduced into the aqueous suspension at the beginning of the polymerization.

Example 3

The procedure was similar to that of Example 2, but 0.015 part of acrylic acid was initially introduced.

Comparative Example 1

The procedure was similar to that of Example 1, but no olefinically unsaturated carboxylic acid was added.

Example 4

The procedure was similar to that of Example 1, but in addition 1 part of hexabromocyclododecane and 0.3 part of dicumyl peroxide were employed in the organic phase.

For three selected screen fractions (1.0 to 1.6 mm; 0.7 to 1.0 mm; 0.4 to 0.7 mm), the internal water content of the beads was determined by Karl-Fischer titration after the various drying times shown in Table 2 in a stream of air at 32° C.

Comparative Example 2

The procedure was similar to that of Example 4, but the potassium sorbate was omitted.

The internal water contents found in Example 4 and Comparative Example 2 are shown in Table 2.

TABLE 1

| Example | Unsaturated carboxylic acid | Mean particle size [mm] | Foaming times [s] | Through- put [kg · h$^{-1}$] | Minimum bulk density [g · l$^{-1}$] |
|---|---|---|---|---|---|
| 1 | 0.05 part of potassium sorbate | 1.3 | 14/19/25 | 220 | 15.7 |
| 2 | 0.05 part of sodium acrylate | 1.01 | 13/18/23 | 230 | 15.5 |
| 3 | 0.015 part of acrylic acid | 0.96 | 14/19/26 | 215 | 15.9 |
| Comparative Example 1 | — | 1.04 | 15/20/28 | 190 | 16.4 |

TABLE 2

| | Unsaturated carboxylic acid | Drying time [h] | Internal water content [% by wt.] | | |
|---|---|---|---|---|---|
| | | | 1.0–1.6 mm | 0.7–1.0 mm | 0.4–0.7 mm |
| Example 4 | 0.05 part of potassium sorbate | 0 | 1.04 | 1.10 | 1.20 |
| | | 1 | 0.32 | 0.25 | 0.20 |
| | | 2 | 0.07 | 0.05 | 0.03 |
| Comparative Example 2 | — | 0 | 0.95 | 1.20 | 1.20 |
| | | 1 | 0.80 | 0.80 | 0.70 |
| | | 2 | 0.45 | 0.40 | 0.35 |

We claim:

1. A process for the preparation of bead-form expandable styrene polymers by polymerizing styrene, optionally in the presence of up to 50% by weight, based on the weight of the styrene polymers, of further comonomers, in aqueous suspension in the presence of organic molecular colloids as suspension stabilizers and conventional styrene-soluble polymerization catalysts and with addition of a blowing agent and, optionally, conventional additives in effective amounts, wherein the aqueous suspension contains at least one olefinically unsaturated carboxylic acid or a water-soluble salt thereof in an amount, based on the organic phase, of from 0.002 to 0.3% by weight of carboxylate anions.

2. A process as claimed in claim 1, wherein an $\alpha,\beta$-unsaturated carboxylic acid or a water-soluble salt thereof is employed.

3. A process as claimed in claim 2, wherein an $\alpha,\beta$-unsaturated carboxylic acid employed is acrylic acid or sorbic acid or a water-soluble salt thereof.

4. A process as claimed in claim 1, wherein the olefinically unsaturated carboxylic acid or a water-soluble salt thereof is employed in an amount, based on the organic phase, of from 0.01 to 0.06% by weight of carboxylate.

* * * * *